Dec. 4, 1928.
W. DOEPKE
DITCHER
Filed Sept. 22, 1925
1,694,252
2 Sheets-Sheet 2
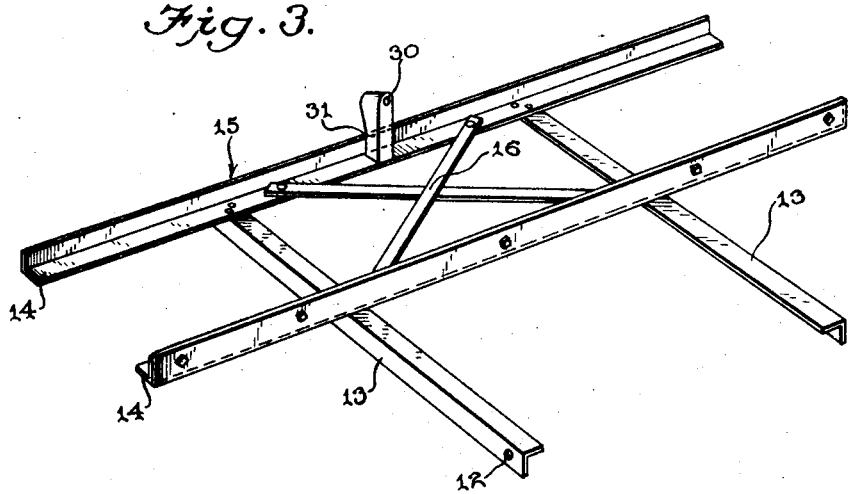
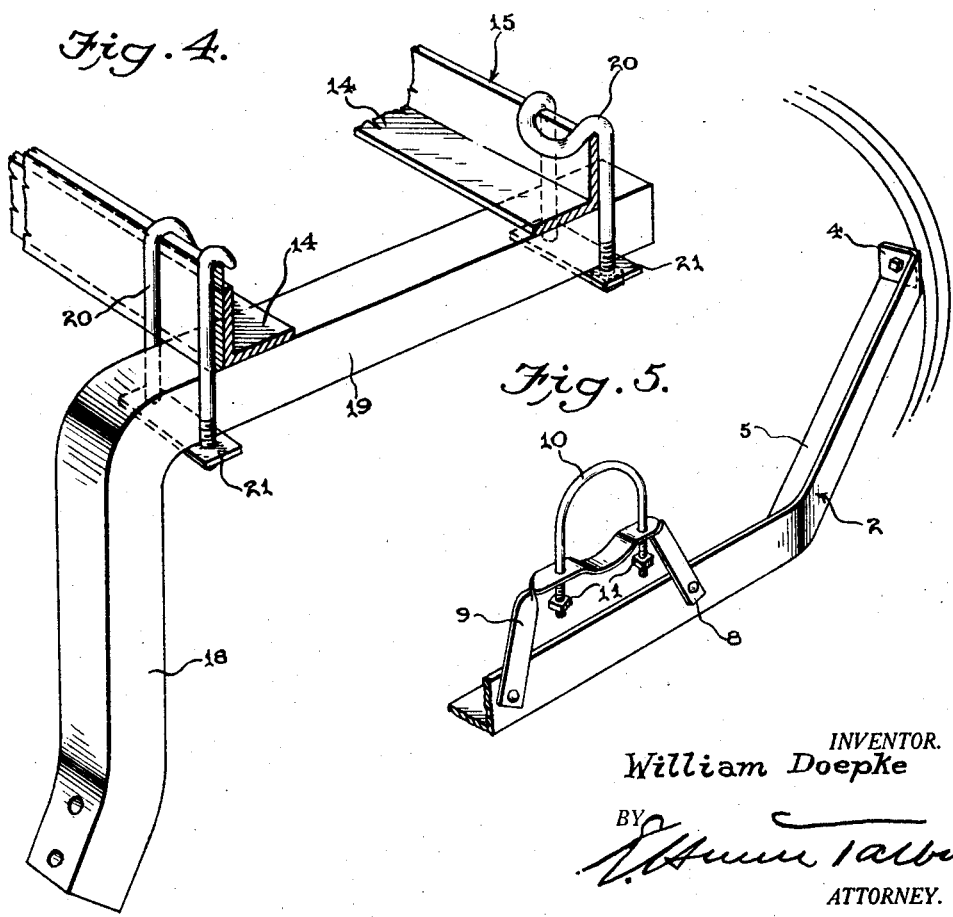
INVENTOR.
William Doepke
BY
ATTORNEY.

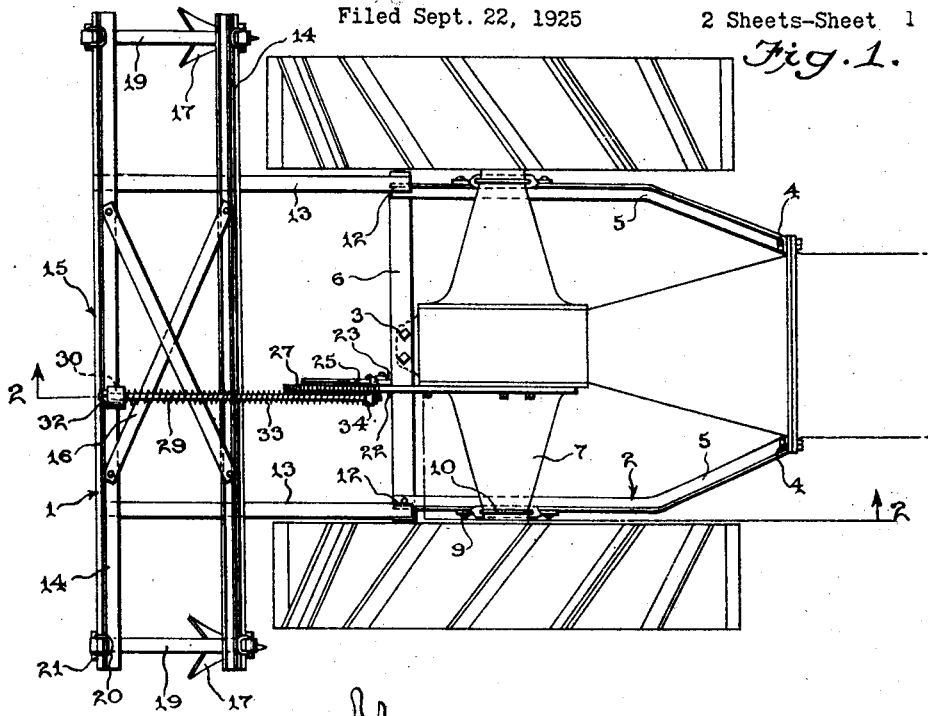

Patented Dec. 4, 1928.

1,694,252

UNITED STATES PATENT OFFICE.

WILLIAM DOEPKE, OF SELAH, WASHINGTON.

DITCHER.

Application filed September 22, 1925. Serial No. 57,842.

The present invention has for its purpose to provide, in a ditcher for attachment to various makes of tractors especially a Fordson tractor, a frame for attachment to the draw bar cap at the rear of the tractor, the frame having means extending forwardly and connecting to the transmission housing and from which frame the ditching elements, such as plows or the like, are suspended, there being means for raising and lowering the frame when excavating a ditch, that is, when such action is desired.

Another purpose is to provide shovel shanks, the construction and arrangement of which, including their attachment to the frame, being such as to prevent all trash, such as grass, weeds, alfalfa and other rubbish, from clogging the ditcher, the frame and the ditching elements being capable of rising to avoid any obstruction in the path of the ditching elements.

Still another purpose is the provision of means included in the connections between the frame and the raising and lowering means to permit the frame to yield in case the ditching elements or plows come in contact with an obstruction, allowing the ditching elements or plows to pass over the obstruction and then restore to operative positions.

A further purpose is the provision of a frame comprising a forward section and a movable rear section, the forward section including means for attachment to the rear axle housing (which is a part of the differential housing) to render the forward section of the frame rigid.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a plan view of a conventional form of tractor, more especially the Fordson type thereof, showing the ditcher as applied.

Figure 2 is a vertical sectional view on line 2—2 of Figure 1, showing the general construction of a Fordson tractor and the ditcher applied and also showing the movable section of the frame as having raised as a result of the ditching elements or plows coming in contact with an obstruction.

Figure 3 is an enlarged detail view of the movable frame of the ditcher.

Figure 4 is an enlarged detail view of one end of the movable section of the frame, showing how the shanks of the ditching elements or plows are connected to the movable section.

Figure 5 is an enlarged detail view of a portion of the forward rigid section of the frame, more clearly showing the construction for supporting said section to the rear axle housing of the differential housing.

Referring to the drawings, 1 designates the frame as a whole which comprises a rear movable section and a forward stationary section, the latter 2 being secured to the draw bar cap, as at 3, and at its forward portion to the transmission housing, as at 4. This stationary section 2 comprises the side bars 5 and the cross bar 6 which is that part of the forward section which is secured to the draw bar cap. The side bars 5 of the forward section are additionally supported on the rear axle housing 7 of the tractor, which axle housing projects from the differential housing.

This additional supporting means comprises the clips 8 each of which consists of lower arched straps 9 rising from the side bars 5 and the U-shaped straps 10. The U-shaped straps 10 straddle the rear axle housing and their arms pass through the transverse portions of the arched straps, there being nuts 11 to secure the arms in position and render the forward section of the frame rigid.

Pivoted at 12 to the rear extremities of the side bars 5 of the forward rigid section of the frame are bars 13 which, as the bars 5, are of angular construction in cross section. Bolted on the bars 13 are the angle bars 14 of the movable section 15 of the frame. The bars 14 are relatively reinforced by the intersecting braces 16 which are bolted to the bars 14.

Ditching elements 17 in the form of plows are provided and these have shanks 18 provided with right angle extending arms 19. In other words, the arms 19 extend rearwardly and by means of U-shaped clips 20, the arms 19 of the shanks 18 are secured to the under portions of the bars 14 of the movable section of the frame. The clips 20 have their upper arched ends bent over the bars 14 of the movable section of the frame, as shown, while the arms of the U-shaped clips straddle the arms of the shanks of the ditching elements and pass through plates 21 and have nuts for holding the various parts together.

By this construction of the shovel or plow shanks, their shapes and their form of attachment to the movable section of the frame, trash such as grass, weeds, alfalfa and other rubbish, are prevented from clogging the ditcher, and by means of pivoting the bars 13 on the bars 5, the movable section of the frame is capable of being raised to prevent contact with an obstruction in the path of the ditching elements, that is to say, in case the operator observes the obstruction in time.

Also fastened to the draw bar cap and extending rearwardly is an angle bar 22 and rising therefrom is a support 23 which comprises two opposed straps, and pivoted between the upper adjacent ends of these straps at 24 is a lever 25 which has a hand grip controlled dog 26 for cooperating with the teeth of a rack 27 which, in turn, is fastened at 28 to the upper part of the differential housing. A rod 29 is connected to the lever 25 and, in turn, passes through an opening or eye 30 formed in a lug 31 projecting from the rear bar of the movable section of the frame. The rod is capable of a sliding movement through the eye or opening, there being a nut 32 on the rear end of the rod to prevent disconnection of the lug from the rod. A spring 33 is in surrounding relation to the rod and interposed between the leg and an abutment 34 at a point near the lever.

Obviously, by moving the lever forward, the rod is pulled and the movable section of the frame is capable of being raised so as to disengage the ditching elements, shovels or plows from the ground. By the provision of the spring in surrounding relation to the rod, the lug on the movable section of the frame is capable of compressing the spring in case the shovels or plows come in contact with an obstruction, the movable section of the frame yielding in order to cause a compression of the spring, thereby allowing the shovels or ditching elements to pass over the obstruction, the spring causing the movable section of the frame to again lower and place the shovels or ditching elements in ditching contact with the ground.

The invention having been set forth, what is claimed is:

1. In combination with a tractor, a frame comprising spaced side bars having a pivotal connection with the tractor, spaced transverse bars spanning the side bars and connected thereto, plows having shanks terminating in right angular arms which are disposed in spanning relation to said transverse bars, and U-shaped clips connected with said arms and having their arched portions bent over and engaging said transverse bars.

2. In combination with a tractor, a frame comprising spaced side bars having a pivotal connection with the tractor, spaced transverse bars spanning the side bars and connected thereto, plows supported at the remote extremities of said transverse bars, an arcuate rack carried by the tractor, a hand lever pivotally mounted on the tractor and provided with a latch engageable with said rack, the rear transverse bar having a lug formed with an eye, a rod connected with said lever and extending through said eye and provided on the rear end with a nut abutting said lug, and a compression spring in surrounding relation to the rod and abutting said lug on the forward face and engaging an abutment adjacent the point of connection of the rod with said hand lever.

In testimony whereof he affixes his signature.

WILLIAM DOEPKE.